(12) United States Patent
Chiu et al.

(10) Patent No.: US 11,906,860 B2
(45) Date of Patent: Feb. 20, 2024

(54) ELECTRONIC DEVICE

(71) Applicant: Innolux Corporation, Miaoli County (TW)

(72) Inventors: Wei-Yen Chiu, Miaoli County (TW); Ming-Jou Tai, Miaoli County (TW); You-Cheng Lu, Miaoli County (TW); Yi-Shiuan Cherng, Miaoli County (TW); Yi-Hsiu Wu, Miaoli County (TW); Chia-Hao Tsai, Miaoli County (TW); Yung-Hsun Wu, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 18/186,951

(22) Filed: Mar. 21, 2023

(65) Prior Publication Data
US 2023/0341732 A1   Oct. 26, 2023

(30) Foreign Application Priority Data
Apr. 20, 2022   (CN) .......................... 202210417645.X

(51) Int. Cl.
*G02F 1/1362* (2006.01)
*G02F 1/1333* (2006.01)
*G02F 1/1343* (2006.01)

(52) U.S. Cl.
CPC .. *G02F 1/136209* (2013.01); *G02F 1/133345* (2013.01); *G02F 1/134309* (2013.01); *G02F 1/136286* (2013.01)

(58) Field of Classification Search
None
See application file for complete search history.

(56) References Cited

U.S. PATENT DOCUMENTS

2017/0358571 A1   12/2017  Chen et al.
2019/0265568 A1*   8/2019  Chen ................. G02F 1/136286

FOREIGN PATENT DOCUMENTS

CN         101162315        4/2008

* cited by examiner

*Primary Examiner* — Richard H Kim
(74) *Attorney, Agent, or Firm* — JCIPRNET

(57) ABSTRACT

An electronic device includes a substrate, a driving element, a first transparent conductive layer, an insulating layer, and a second transparent conductive layer. The driving element is disposed on the substrate and includes a drain electrode having a first edge. The first transparent conductive layer is disposed on the driving element. The insulating layer is disposed between the driving element and the first transparent conductive layer and includes a hole through which the first transparent conductive layer is electrically connected to the driving element. The second transparent conductive layer is disposed on the insulating layer. One of the first and second transparent conductive layers includes at least one slit, and the first or second transparent conductive layer that includes the at least one slit has a second edge. The second edge is located in the hole, and the at least one slit exposes the first edge of the drain electrode.

20 Claims, 11 Drawing Sheets

ELECTRONIC DEVICE

CROSS-REFERENCE TO RELATED APPLICATION

This application claims the priority benefit of China application serial no. 202210417645.X, filed on Apr. 20, 2022. The entirety of the above-mentioned patent application is hereby incorporated by reference herein and made a part of this specification.

BACKGROUND

Technical Field

The disclosure relates to an electronic device.

Description of Related Art

In order to meet requirements for light weight, high resolution, and wide field of view (FOV), it is necessary to increase the pixel density of the electronic device. However, the existing design of increasing the pixel density causes liquid crystal disclination lines to enter an aperture region of the pixels, which affects the liquid crystal efficiency and reduces transmissivity. In response thereto, a backlight brightness of the electronic device should be increased to comply with the brightness specification, which however leads to an increase in power consumption of the electronic device.

SUMMARY

The disclosure provides an electronic device which is conducive to an improvement of a liquid crystal efficiency or transmissivity.

An embodiment of the disclosure provides an electronic device that includes a substrate, a driving element, a first transparent conductive layer, an insulating layer, and a second transparent conductive layer. The driving element is disposed on the substrate and includes a drain electrode. The drain electrode has a first edge. The first transparent conductive layer is disposed on the driving element. The insulating layer is disposed between the driving element and the first transparent conductive layer and includes a hole, and the first transparent conductive layer is electrically connected to the driving element through the hole. The second transparent conductive layer is disposed on the insulating layer. One of the first transparent conductive layer and the second transparent conductive layer includes at least one slit, and the first transparent conductive layer or the second transparent conductive layer that includes the at least one slit has a second edge. The second edge is located in the hole, and the at least one slit exposes the first edge of the drain electrode.

In order for the features and advantages of the disclosure to be more comprehensible, the following specific embodiments are described in detail in conjunction with the drawings.

BRIEF DESCRIPTION OF THE DRAWINGS

The accompanying drawings, which are included to provide a further understanding of the disclosure, are incorporated in and constitute a part of this specification. The drawings illustrate embodiments of the disclosure and, together with the description, serve to explain the principles of the disclosure.

FIG. 1C' illustrates another embodiment corresponding to FIG. 1C.

DETAILED DESCRIPTION OF DISCLOSED EMBODIMENTS

Figure 1B:
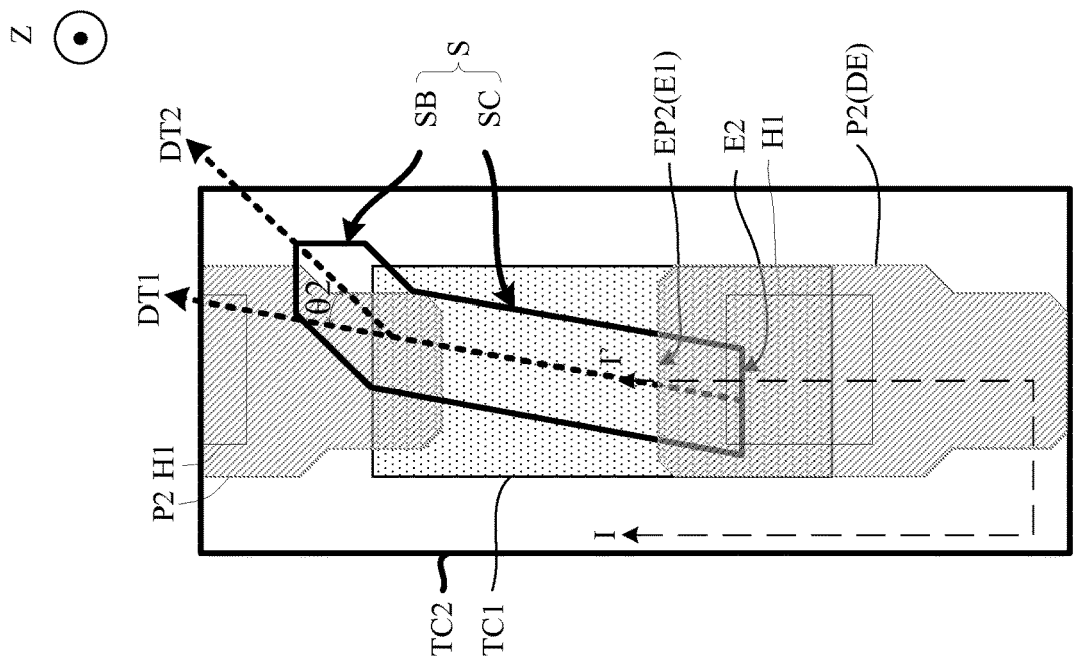
FIG. 1A and FIG. 1B, FIG. 3A and FIG. 3B, FIG. 4A and FIG. 4B, and FIG. 5A and FIG. 5B are schematic top views of a portion of the electronic device according to different embodiments of the disclosure.

Reference will now be made in detail to the exemplary embodiments of the disclosure, and examples of the exemplary embodiments are illustrated in the accompanying drawings. Whenever possible, the same reference numbers are used in the drawings and descriptions to indicate the same or similar parts.

Certain terminologies throughout the description and the following claims serve to refer to specific components. As will be understood by those skilled in the art, electronic device manufacturers may denote components by different names. It is not intended to distinguish the components that differ by name but not by function. In the following specification and claims, the terminologies "including," "comprising," "having," etc. are open-ended terminologies, so they should be interpreted to mean "including but not limited to . . . ".

The directional terminologies mentioned in the disclosure, such as "upper", "lower", "front", "rear", "left", "right" and so on, are used with reference to the accompanying drawings. Therefore, the directional terminologies used are for illustrative but not restrictive purposes in the disclosure. In the accompanying drawings, each drawing shows the general features of the methods, structures and/or materials adopted in a specific embodiment. However, the drawings should not be construed as defining or limiting the scope or nature covered by the embodiments. For example, for clarity, the relative size, thickness, and position of each layer, region, and/or structure may be reduced or enlarged.

When a structure (or layer, component, substrate) is referred to as being located "on/above" another structure (or layer, component, substrate) in the disclosure, it may refer to the two structures being adjacent and directly connected, or it may mean that the two structures are adjacent but not directly connected. "Indirect connection" means that there is at least one intermediary structure (or intermediary layer, intermediary component, intermediary substrate, intermediary spacer) between the two structures, in which the lower surface of a structure is adjacent to or directly connected to the upper surface of the intermediary structure, and the upper surface of the other structure is adjacent to or directly connected to the lower surface of the intermediary structure. The intermediary structure may be a single-layer or multi-layer physical or non-physical structure, and there is no limitation. In the disclosure, when a structure is disposed "on" another structure, it may mean that the structure is "directly" on another structure, or that the structure is "indirectly" on another structure, with at least one structure sandwiched between the two structures.

The terminologies "about", "equal", "equivalent", "identical", "substantially" or "approximately" are generally interpreted as being within 10% of a given value or range. In addition, the terminologies "a given range is a first value to a second value" and "a given range falls within a range of a first value to a second value" means that the given range includes the first value, the second value, and other values in between.

The ordinal numbers used in the specification and claims, such as the terminologies "first", "second" and the like, to qualify a component do not imply or represent that the component or components are preceded with any ordinal numbers, nor do they represent the order of a certain component and another component, or the order in the manufacturing method, and are used only so as to clearly distinguish a component with one name from another component with the same name. Different terminologies may be used in the claims and the specification, and accordingly, a first component in the specification may be a second component in the claims.

The electrical connection or coupling described in this disclosure may refer to direct connection or indirect connection. In the case of direct connection, the endpoints of the components on the two circuits are directly connected or are connected to each other by a conductor segment. In the case of indirect connection, between the end points of the components on the two circuits there are switches, diodes, capacitors, inductances, other suitable components, or a combination of the above-mentioned components, but the disclosure is not limited thereto.

In the disclosure, thickness, length, and width may be measured by an optical microscope, and thickness or width may be measured by a cross-sectional image in an electron microscope, but the disclosure is not limited thereto. Moreover, any two values or directions used for comparison may have certain errors. The terminologies "about", "equal", "equivalent", "identical", "substantially" or "approximately" are generally interpreted as being within 10% of a given value or range. In addition, the terminologies "a given range is a first value to a second value" and "a given range falls within a range of a first value to a second value" means that the given range includes the first value, the second value, and other values in between. If a first direction is perpendicular to a second direction, the angle between the first direction and the second direction may be between 80 degrees and 100 degrees. If the first direction is parallel to the second direction, the angle between the first direction and the second direction may be between 0 degrees and 10 degrees.

Note that in the following embodiments, the technical features provided in several different embodiments may be replaced, reorganized, and mixed without departing from the spirit of the disclosure so as to complete other embodiments. The technical features of the embodiments may be mixed and matched arbitrarily as long as they do not violate the spirit of the disclosure or conflict with each other.

Unless otherwise defined, all terminologies (including technical and scientific terminologies) used herein have the same meaning as commonly understood by people having ordinary skill in the art to which the disclosure belongs. It is understood that these terminologies, such as those defined in commonly used dictionaries, should be interpreted as having meanings consistent with the relevant art and the background or context of the disclosure, and should not be interpreted in an idealized or overly formal way, unless otherwise defined in the embodiments of the disclosure.

The electronic device disclosed in the specification may include a display device, a backlight device, an antenna device, a sensing device, or a tiled device, but is not limited thereto. The electronic device may be a bendable or flexible electronic device. The display device may be a non-self-luminous display device or a self-luminous display device. The electronic device may include, for example, liquid crystal, light emitting diode, fluorescence, phosphor, quantum dot (QD), other suitable display media, or a combination of the foregoing. The antenna device may be a liquid crystal antenna device or a non-liquid crystal antenna device, and the sensing device may be a sensing device for sensing capacitance, light, heat, or ultrasonic waves, but is not limited thereto. In the disclosure, the electronic components may include passive components and active components, such as capacitors, resistors, inductors, diodes, transistors, and the like. The diodes may include light emitting diodes or photodiodes. The light emitting diodes may include, for example, organic light emitting diodes (OLED), sub-millimeter light emitting diodes (mini LED), micro light emitting diodes (micro LED), or quantum dot light emitting diodes (quantum dot LED), but is not limited thereto. The tiled device may be, for example, a display tiled device or an antenna tiled device, but is not limited thereto. It should be noted that the electronic device may be any arrangement and combination of the foregoing, but not limited to thereto. In addition, the appearance of the electronic device may be rectangular, circular, polygonal, in a shape with curved edges, or in other suitable shapes. The electronic device may have peripheral systems such as a driving system, a control system, a light source system . . . and the like, so as to support a display device, an antenna device, a wearable device (e.g., including augmented reality or virtual reality), an in-vehicle device (e.g., including car windshield), or a tiled device. The display device is used as the electronic device or the tiled device to illustrate the disclosure hereinafter, but the disclosure is not limited thereto.

FIG. 1A and FIG. 1B, FIG. 3A and FIG. 3B, FIG. 4A and FIG. 4B, and FIG. 5A and FIG. 5B are schematic top views of a portion of the electronic device according to different embodiments of the disclosure, where the A series of drawings and the B series of drawings respectively depict different film layers in the same region of the electronic device, so as to clearly show the relative relationship of how the film layers are disposed. FIG. 1C, FIG. 3C, FIG. 4C, and FIG. 5C are schematic cross-sectional views respectively corresponding to a sectional line I-I' in FIG. 1A and FIG. 1B, FIG. 3A and FIG. 3B, FIG. 4A and FIG. 4B, and FIG. 5A and FIG. 5B. FIG. 1C' illustrates another embodiment corresponding to FIG. 1C. FIG. 2A to FIG. 2E are schematic top views of a portion of the electronic device according to different embodiments of the disclosure.

Figure 1A:
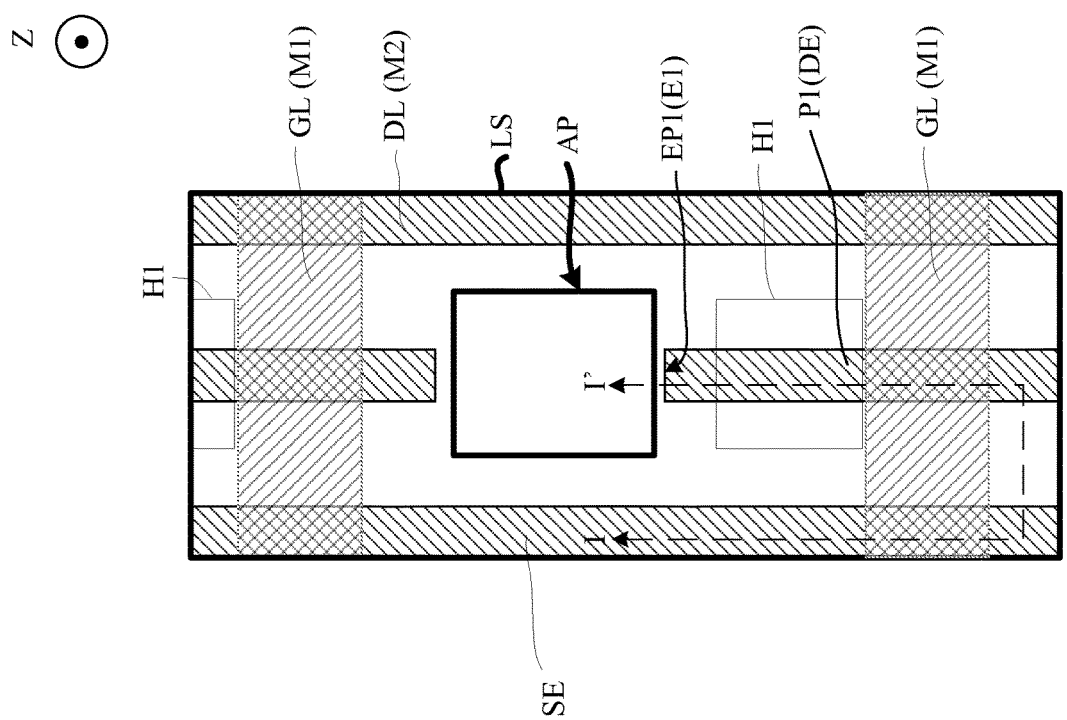
Figure 1C:
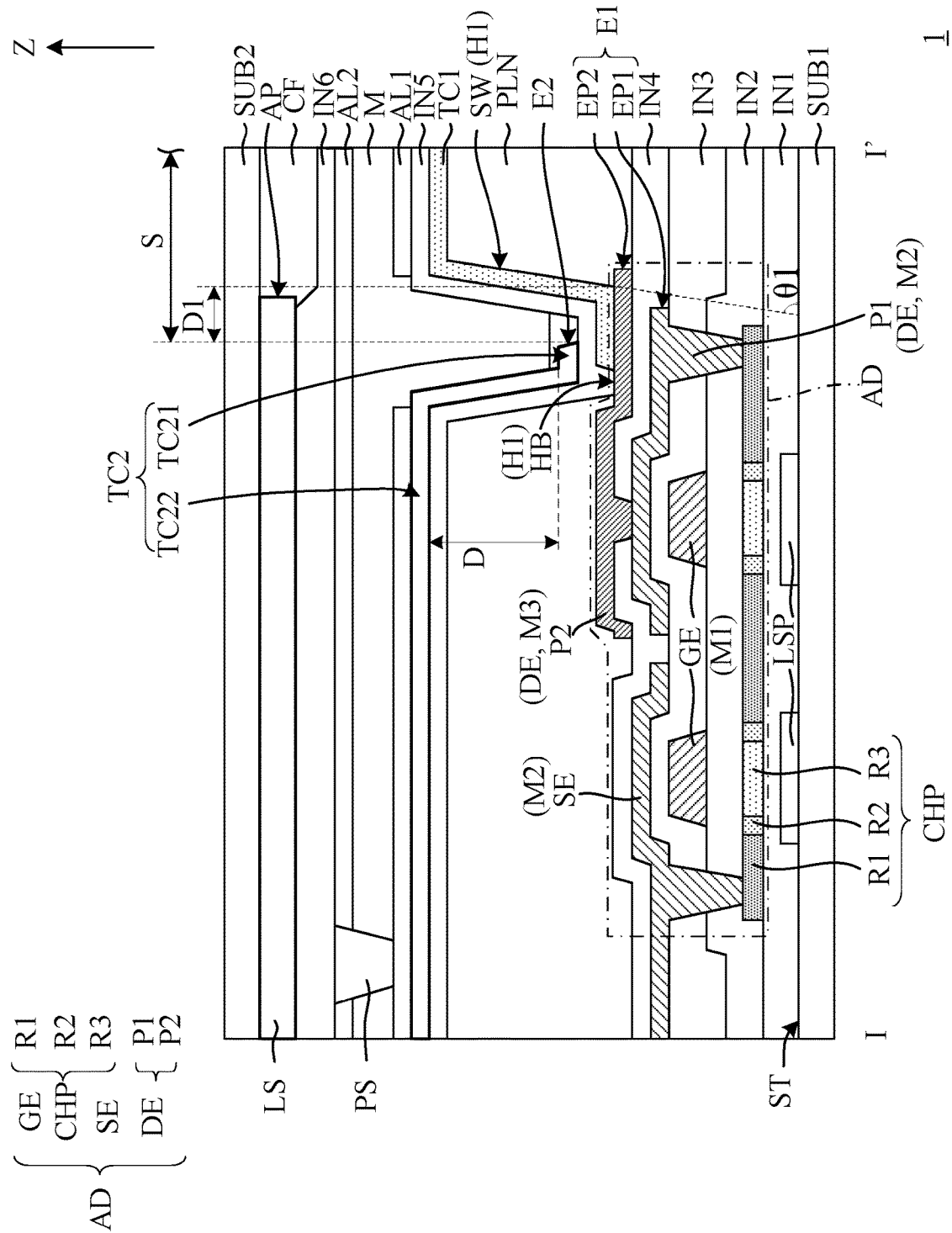
FIG. 1C, FIG. 3C, FIG. 4C, and FIG. 5C are schematic cross-sectional views respectively corresponding to a sectional line I-I' in FIG. 1A and FIG. 1B, FIG. 3A and FIG. 3B, FIG. 4A and FIG. 4B, and FIG. 5A and FIG. 5B.
Figure 1C:
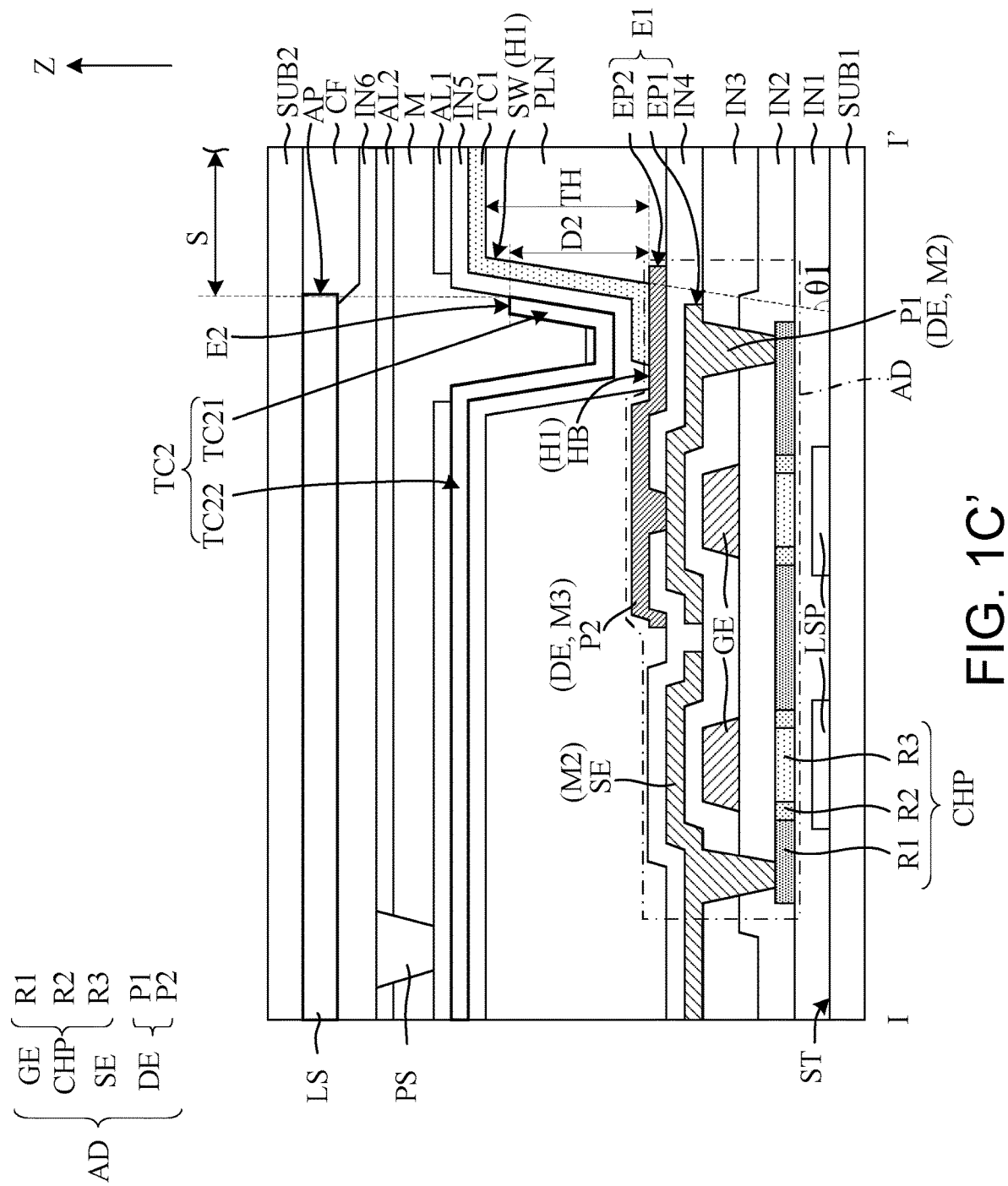

With reference to FIG. 1A to FIG. 1C, FIG. 1A and FIG. 1B respectively illustrate different film layers in the same region of the electronic device to clearly show the relative relationship of how the film layers are disposed. FIG. 1C is a schematic cross-sectional view corresponding to the sectional line I-I' in FIG. 1A and FIG. 1B. An electronic device 1 may include a substrate SUB1, a driving element AD, a first transparent conductive layer TC1, an insulating layer PLN, and a second transparent conductive layer TC2. The driving element AD is disposed on the substrate SUB1 and includes a drain electrode DE. The drain electrode DE has a first edge E1. The first transparent conductive layer TC1 is disposed on the driving element AD. The insulating layer PLN is disposed between the driving element AD and the first transparent conductive layer TC1 and includes a hole H1. The first transparent conductive layer TC1 is electrically connected to the driving element AD through the hole H1. The second transparent conductive layer TC2 is disposed on the insulating layer PLN. One of the first transparent conductive layer TC1 and the second transparent conductive layer TC2 includes at least one slit S, and the first transparent conductive layer TC1 or the second transparent conductive layer TC2 that includes the at least one slit S has a second edge E2. The second edge E2 is located in the hole H1, and the at least one slit S exposes the first edge E1 of the drain electrode DE. According to some embodiments, the first transparent conductive layer TC1 may be a pixel electrode, and the second transparent conductive layer TC2 may be a common electrode. The second edge E2 of the first transparent conductive layer TC1 or the second transparent conductive layer TC2 including the at least one slit S may be an edge of the at least one slit S. For instance, as shown in FIG. 1A to FIG. 1C, the second transparent conductive layer TC2 includes the slit S, and the second edge E2 may be the edge of the slit S of the second transparent conductive layer TC2.

In detail, the substrate SUB1 may be a rigid substrate or a flexible substrate. A material of the substrate SUB1 includes glass, quartz, a ceramic material, sapphire, or a plastic material, which should however not be construed as a limitation in the disclosure. The plastic material includes polycarbonate (PC), polyimide (PI), polypropylene (PP), polyethylene terephthalate (PET), other appropriate flexible materials, or a combination of the aforementioned materials, which should however not be construed as a limitation in the disclosure.

The drain electrode DE of the driving element AD may be a single-layer conductive layer or a multi-layer conductive layer. FIG. 1C is taken as an example. The drain electrode DE is, for instance, a multi-layer conductive layer and includes a first portion P1 and a second portion P2, where the first portion P1 is located between the second portion P2 and the substrate SUB1, and the second portion P2 is electrically connected to the first portion P1. A material of the first portion P1 and the second portion P2 may include metal or a metal stacked layer, such as aluminum, copper, molybdenum, titanium, or a combination thereof, which should however not be construed as a limitation in the disclosure. The second portion P2 may serve to be adapted to an electrode signal, reduce a contact impedance of the transparent conductive layer (such as the first transparent conductive layer TC1) or block the backlight, and reduce light leakage resulting from the topography of the hole H1. In other embodiments, the drain electrode DE of the driving element AD may be a single-layer conductive layer, which is however not shown in the drawings. For instance, the drain electrode DE of the driving element AD in the electronic device 1 may not include the second portion P2, which should however not be construed as a limitation in the disclosure.

In addition to the drain electrode DE, the driving element AD may further include a semiconductor pattern CHP, a gate electrode GE, and a source electrode SE, which should however not be construed as a limitation in the disclosure. Thus, the driving element AD may be a thin film transistor (TFT), which should however not be construed as a limitation in the disclosure. The semiconductor pattern CHP is disposed on the substrate SUB1. In some embodiments, a material of the semiconductor pattern CHP includes polysilicon, and the semiconductor pattern CHP includes a heavily doped region R1, a lightly doped region R2, and a channel region R3, which should however not be construed as a limitation in the disclosure. FIG. 1C schematically shows three heavily doped regions R1, four lightly doped regions R2, and two channel regions R3, where the lightly doped regions R2 are located between the heavily doped regions R1 and the channel regions R3. However, it should be understood that design parameters such as the material of the semiconductor pattern CHP, the type or quantity of regions, and so on may be changed according to different requirements and are not limited to those shown in FIG. 1C. For instance, the material of the semiconductor pattern CHP may include amorphous silicon, polysilicon, an oxide semiconductor material, or a combination thereof. The oxide semiconductor is, for instance, indium gallium zinc oxide (IGZO), which should however not be construed as a limitation in the disclosure.

The driving element AD may include the gate electrode GE, and the gate electrode GE may be disposed above or below the semiconductor pattern CHP. For instance, the gate electrode GE overlaps the channel region R3 in the normal direction Z of the substrate SUB1. The normal direction Z of the substrate SUB1 is, for instance, a direction perpendicular to the upper surface ST of the substrate SUB1. A material of the gate electrode GE may include metal or a metal stacked layer, such as aluminum, copper, molybdenum, titanium, or a combination thereof, which should however not be constructed as a limitation in the disclosure. In FIG. 1C, the gate electrode GE is exemplarily disposed above the semiconductor pattern CHP, which should however not be construed as a limitation in the disclosure.

The source electrode SE and the drain electrode DE are disposed above the gate electrode GE, and each of the source electrode SE and the drain electrode DE is electrically connected to the corresponding heavily doped region R1 through the insulating layer (such as the insulating layer IN2 and the insulating layer IN3) respectively between the source electrode SE and the semiconductor pattern CHP and between the drain electrode DE and the between semiconductor pattern CHP. A material of the source electrode SE may be referred to as the material of the drain electrode DE, which will not be repeated hereinafter.

It should be understood that FIG. 1C merely schematically illustrates one embodiment of the driving element AD, while the design parameters, such as the type of the driving element AD, the relative relationship of how the electrodes in the driving element AD (such as the gate electrode GE, the source electrode SE, and the drain electrode DE) and/or the semiconductor pattern is disposed, or the number of the electrodes may be changed according to different requirements and should not be limited to those shown in FIG. 1C. According to the top views of FIG. 1A and FIG. 1B, the range indicated by the hole H1 may represent a bottom or a top of the hole H1 of the insulating layer PLN in the cross-sectional view of FIG. 1C, e.g., the bottom of the hole H1. In this disclosure, the range marked by any hole (such as the hole H1 or the hole H2) may represent the bottom or the top of the hole of the insulating layer PLN in the corresponding cross-sectional view, e.g., the bottom of the hole.

The insulating layer PLN is disposed on the driving element AD. A material of the insulating layer PLN may include an inorganic material, such as silicon oxide, silicon nitride, silicon oxynitride, aluminum oxide, or an organic material, e.g., perfluoroalkoxy alkane (PFA), which should however not be construed as a limitation in the disclosure.

As shown in the cross-sectional view of FIG. 1C, the hole H1 of the insulating layer PLN has a sidewall SW. In some embodiments, an included angle θ1 between the sidewall SW and the upper surface ST of the substrate SUB1 ranges from 40 degrees to 85 degrees (40 degrees≤θ1≤85 degrees). As shown in the cross-sectional view of the electronic device 1 in FIG. 1C, when the sidewall SW appears to be a straight line, the included angle θ1 is, for instance, an included angle between an extension line of the sidewall SW and the upper surface ST of the substrate SUB1; when the sidewall SW appears to be a non-linear line (such as an arc), the included angle θ1 is, for instance, an included angle between a tangent of the sidewall SW at half the height of the sidewall SW and the upper surface ST of the substrate SUB1. Given the area observed from the top view stays the same, the greater the included angle θ1 is, the greater the depth of the hole H1 is, which is conducive to an increase in the level difference of the same film layer formed on the insulating layer PLN and in the hole H1. According to some embodiments, the included angle θ1 may range from 50 degrees to 85 degrees, e.g., from 65 degrees to 85 degrees or from 70 degrees to 85 degrees.

Given that the drain electrode DE includes the first portion P1 and the second portion P2, the hole H1 of the insulating layer PLN may partially expose the second portion P2, so that the first transparent conductive layer TC1 may be electrically connected to the second portion P2 of the drain electrode DE through the hole H1, and that the first transparent conductive layer TC1 is allowed to be electrically connected to the driving element AD. On the other hand, under the framework that the drain electrode DE includes the first portion P1 but does not include the second portion P2, although not shown, the hole H1 of the insulating layer PLN may partially expose the first portion P1, so that the first transparent conductive layer TC1 may be electrically connected to the first portion P1 of the drain electrode DE through the hole H1, thus allowing the first transparent conductive layer TC1 to be electrically connected to the driving element AD.

As shown in FIG. 1C, the first transparent conductive layer TC1 and the second transparent conductive layer TC2 are disposed on the insulating layer PLN. A material of the first transparent conductive layer TC1 and the second transparent conductive layer TC2 may include metal oxide, such as indium tin oxide, aluminum zinc oxide, indium zinc oxide, or other transparent conductive materials, such as graphene or nano-silver, which should however not be construed as a limitation in the disclosure.

In some embodiments, the first transparent conductive layer TC1 may be located between the second transparent conductive layer TC2 and the insulating layer PLN (as shown in FIG. 1C), and the second transparent conductive layer TC2 may include the at least one slit S (as shown in FIG. 1B or FIG. 1C). The at least one slit S exposes the first edge E1 of the drain electrode DE. Under the framework that the drain electrode DE includes the first portion P1 and the second portion P2, the first edge E1 of the drain electrode DE may include an edge EP1 of the first portion P1 and an edge EP2 of the second portion P2, and the at least one slit S may expose the edge EP1 of the first portion P1 (as shown in FIG. 1C) and expose the edge EP2 of the second portion P2 (as shown in FIG. 1B). Under the framework that the drain electrode DE includes the first portion P1 but does not include the second portion P2, the at least one slit S exposes the edge EP1 of the first portion P1. In this embodiment, the first transparent conductive layer TC1 may be a pixel electrode, the second transparent conductive layer TC2 may be a common electrode, and the second transparent conductive layer TC2 is disposed above the first transparent conductive layer TC1, thus constituting an electronic device of a top-common type.

In some embodiments, as shown in FIG. 1B, the at least one slit S may include an end portion SB far from the drain electrode DE, and the end portion SB includes a protrusion. In addition, the at least one slit S may further include a trunk portion SC connected to the end portion SB. An included angle θ2 between an extension direction DT1 of the trunk portion SC and a direction DT2 in which the protrusion faces away from the trunk portion SC ranges from 10 degrees to 80 degrees, for instance. For instance, the included angle θ2 may be 35 degrees, which should however not be construed as a limitation in the disclosure. The extension direction DT1 of the trunk portion SC refers to an extension direction of a central line of the trunk portion SC, for instance, and the direction DT2 in which the protrusion faces away from the trunk portion SC is, for instance, the extension direction of the central line of the end portion SB. According to some embodiments, the included angle θ2, for instance, ranges from 20 degrees to 70 degrees, e.g., from 25 degrees to 50 degrees or from 30 degrees to 45 degrees.

As shown in FIG. 1B and FIG. 1C, the second transparent conductive layer TC2 that includes at least one slit S has a second edge E2, and the second edge E2 is located in the hole H1. That is, the second edge E2 overlaps the hole H1 of the insulating layer PLN in the normal direction Z, and in the cross-sectional view of the electronic device 1, as shown in FIG. 1C, the second edge E2 is located between the bottom and the top of the hole H1.

In some embodiments, as shown in FIG. 1C, one portion TC21 of the second transparent conductive layer TC2 is disposed at the bottom HB of the hole H1, and the other portion TC22 of the second transparent conductive layer TC2 is disposed on the insulating layer PLN, where the minimum distance D from the portion TC21 of the second transparent conductive layer TC2 in the normal direction Z to the other portion TC22 of the second transparent conductive layer TC2 ranges from 0.5 μm to 2.5 μm for instance. In addition, a distance D1 between the second edge E2 and the bottom edge of the hole H1 is, for instance, greater than 0 μm and less than 3 μm. In other embodiments, as shown in FIG. 1C', the one portion TC21 of the second transparent conductive layer TC2 may be disposed on the sidewall SW of the hole H1, which should however not be construed as a limitation in the disclosure. In the normal direction Z, a distance D2 between the second edge E2 and the bottom HB of the hole H1 may range from 0% to 80% of a thickness TH of the insulating layer PLN, e.g., the distance between the bottom of the hole H1 and the top of the hole H1 in the normal direction Z.

According to different requirements, as shown in FIG. 1C, the electronic device 1 may further include other film layers or elements. For instance, the electronic device 1 may further include a light shielding pattern LSP, an insulating layer IN1, an insulating layer IN2, a conductive layer M1, an insulating layer IN3, a conductive layer M2, an insulating layer IN4, a conductive layer M3, an insulating layer IN5, an alignment layer AL1, a substrate SUB2, a light shielding layer LS, a color filter pattern CF, an insulating layer IN6, an alignment layer AL2, a spacer PS, and a display medium layer M, which should however not be construed as a limitation in the disclosure. One or a plurality of elements or film layers may be added to or removed from the electronic device 1 according to different demands.

As shown in FIG. 1C, the light shielding pattern LSP is disposed on the substrate SUB1 and, for instance, overlaps the channel region R3 in the normal direction Z of the substrate SUB1, so as to reduce the interference of the backlight (not shown) of the electronic device 1 in the channel region R3. A material of the light shielding pattern LSP may include a light absorbing material or a light reflective material, such as metal or alloy, which should however not be construed as a limitation in the disclosure.

The insulating layer IN1 is disposed on the substrate SUB1 and covers the light shielding pattern LSP. A material of the insulating layer IN1 includes, for instance, an inorganic material, such as silicon oxide, silicon nitride, or silicon oxynitride, which should however not be construed as a limitation in the disclosure.

The semiconductor pattern CHP is disposed on the insulating layer IN1 and located above the light shielding pattern LSP. The related descriptions of the semiconductor pattern CHP may be referred to as those provided above and thus will not be repeated hereinafter.

The insulating layer IN2 is disposed on the insulating layer IN1 and covers the semiconductor pattern CHP. The related descriptions of a material of the insulation layer IN2 may be referred to as the material of the insulation layer IN1 provided above and thus will not be repeated hereinafter.

The conductive layer M1 is disposed on the insulating layer IN2 and, for instance, includes the gate electrode GE and the scan line GL, which should however not be construed as a limitation in the disclosure. The gate electrode GE is electrically connected to the corresponding scan line GL. The related descriptions of a material of the conductive layer M1 may be referred to as the material of the gate electrode GE provided above and thus will not be repeated hereinafter.

The insulating layer IN3 is disposed on the insulating layer IN2 and covers the conductive layer M1. The related descriptions of a material of the insulation layer IN3 may be referred to as the material of the insulation layer IN1 provided above and thus will not be repeated hereinafter.

The conductive layer M2 is disposed on the insulating layer IN3 and, for instance, includes the first portion P1 of the drain electrode DE, the source electrode SE, and a data line DL, which should however not be construed as a limitation in the disclosure. The first portion P1 of the drain electrode DE penetrates the insulating layer IN3 and the insulating layer IN2 and is electrically connected to a corresponding heavily doped region R1. The source electrode SE is electrically connected to the corresponding data line DL, and the source electrode SE penetrates the insulating layer IN3 and the insulating layer IN2 and is electrically connected to another corresponding heavily doped region R1. The related descriptions of a material of the conductive layer M2 may be referred to as the material of the source electrode SE provided above and thus will not be repeated hereinafter.

The insulating layer IN4 is disposed on the insulating layer IN3 and covers the conductive layer M2. The related descriptions of a material of the insulation layer IN4 may be referred to as the material of the insulation layer IN1 provided above and thus will not be repeated hereinafter.

The conductive layer M3 is disposed on the insulating layer IN4 and, for instance, includes the second portion P2 of the drain electrode DE, which should however not be construed as a limitation in the disclosure. The second portion P2 is disposed above the first portion P1, penetrates the insulating layer IN4, and is electrically connected to the first portion P1. The related descriptions of a material of the conductive layer M3 may be referred to as the material of the first portion P1 provided above and thus will not be repeated hereinafter.

The insulating layer PLN is disposed on the insulating layer IN4 and the conductive layer M3, and the hole H1 of the insulating layer PLN partially exposes the second portion P2. The related descriptions of the insulation layer PLN may be referred to as those provided above and thus will not be repeated hereinafter.

The first transparent conductive layer TC1 is disposed on the insulating layer PLN and extends into the bottom HB of the hole H1. The related descriptions of the first transparent conductive layer TC1 may be referred to as those provided above and thus will not be repeated hereinafter.

The insulating layer IN5 is disposed on the insulating layer PLN and the first transparent conductive layer TC1. The related descriptions of a material of the insulation layer IN5 may be referred to as the material of the insulation layer IN1 provided above and thus will not be repeated hereinafter.

The second transparent conductive layer TC2 is disposed on the insulating layer IN5 and extends into the hole H1. For instance, the second transparent conductive layer TC2 may extend to the sidewall SW or the bottom HB of the hole H1. The related descriptions of the second transparent conductive layer TC2 may be referred to as those provided above and thus will not be repeated hereinafter.

The alignment layer AL1 is disposed on the second transparent conductive layer TC2 and the insulating layer IN5, and a portion of the alignment layer AL1 may cover the second transparent conductive layer TC2 (e.g., the portion TC21) disposed at the bottom HB of the hole H1. A material of the alignment layer AL1 may include polymers, which should however not be construed as a limitation in the disclosure.

The substrate SUB2 and the substrate SUB1 are disposed opposite to each other, and the related descriptions of a material of the substrate SUB2 may be referred to as the material of the substrate SUB1 provided above and thus will not be repeated hereinafter.

The light shielding layer LS is disposed on a surface of the substrate SUB2 facing the substrate SUB1 and has an aperture AP. The region occupied by the aperture AP is serves as an aperture region of the pixel. The light shielding layer LS may be made of a light absorbing material. The light absorbing material includes black matrix, for instance, which should however not be construed as a limitation in the disclosure.

The color filter pattern CF is disposed in the aperture AP. The electronic device 1 may include a plurality of the color filter patterns CF, such as a plurality of red filter patterns, a plurality of green filter patterns, and a plurality of blue filter patterns, and each of the filter patterns is disposed in a corresponding aperture AP.

The insulating layer IN6 is disposed on the light shielding layer LS and the color filter pattern CF. The related descriptions of a material of the insulating layer IN6 may be referred to as the material of the insulation layer IN1 provided above and thus will not be repeated hereinafter.

The alignment layer AL2 is disposed on the insulating layer IN6. The related descriptions of a material the alignment layer AL2 may be referred to as the material of the alignment layer AL1 provided above and thus will not be repeated hereinafter.

The spacer PS may be disposed on the substrate SUB1 or the substrate SUB2, and the display medium layer M may be disposed between the alignment layer AL1 and the alignment layer AL2. FIG. 1C is taken as an example, where the spacer PS is, for instance, disposed on the insulating layer IN6 on the substrate SUB2, and then the alignment layer AL2 is formed on the insulating layer IN6, which should however not be construed as a limitation in the disclosure. In other embodiments not shown in the drawings, the spacer PS may be disposed on the substrate SUB1; for instance, the spacer PS may be disposed on the insulating layer IN5 on the substrate SUB1, and then the alignment layer AL1 is formed on the insulating layer IN5. The spacer PS may serve to keep a liquid crystal cell gap. The electronic device 1 may include a plurality of spacers PS, such as a plurality of main spacers and a plurality of secondary spacers. It should be understood that the main spacers/the secondary spacers are not limited to be formed on the substrate SUB2. Although not shown in the drawings, the main spacers/the secondary spacers may be formed on the substrate SUB1; alternately, one of the main spacer and the secondary spacer may be formed on the substrate SUB2, and the other of the main spacer and the secondary spacer may be formed on the substrate SUB1. A material of the display medium layer M includes liquid crystal, for instance.

Through placing the second edge E2 of the transparent conductive layer with the at least one slit S (such as the second transparent conductive layer TC2) in the hole H1, the hole H1 of the insulating layer PLN may serve to create the level difference (such as the minimum distance D) of the transparent conductive layer. By the graphic design of the level difference and the slit S, the electric field distribution may be changed, and the ratio of liquid crystal disclination lines entering the aperture region (the top view of the region occupied by the aperture AP) may be reduced, which is conducive to the improvement of the liquid crystal efficiency or the transmissivity. FIG. 1C is taken as an example. Through the above design of the included angle θ1 and the minimum distance D (that is, the level difference of the second transparent conductive layer TC2), the electric field distribution at the lower left corner of the slit S in the top view of the electronic device 1 (as shown in FIG. 1B) may be improved, and the liquid crystal efficiency may be further enhanced. In addition, according to the design of the included angle θ2, the shape of the end portion SB of the slit S is adjusted, so that the electric field distribution at the upper right corner of the slit S may be improved, and the liquid crystal efficiency may be further enhanced. Under the framework shown in FIG. 1C, the liquid crystal efficiency may be increased to 14%-20% according to a calculation result of a simulation software.

It should be understood that the shape of the end portion SB of the slit S is not limited to what is shown in FIG. 1B. FIG. 2A to FIG. 2E further illustrate various graphic designs of the slit S, but the shape of the slit S in the top views is not limited thereto, and the graphic designs of the slit S shown in FIG. 2A to FIG. 2E may be adopted in any embodiment of the disclosure. According to some embodiments, the end portion SB of the slit S may have an arc shape, as shown in FIG. 2B and FIG. 2C.

Figure 2A:
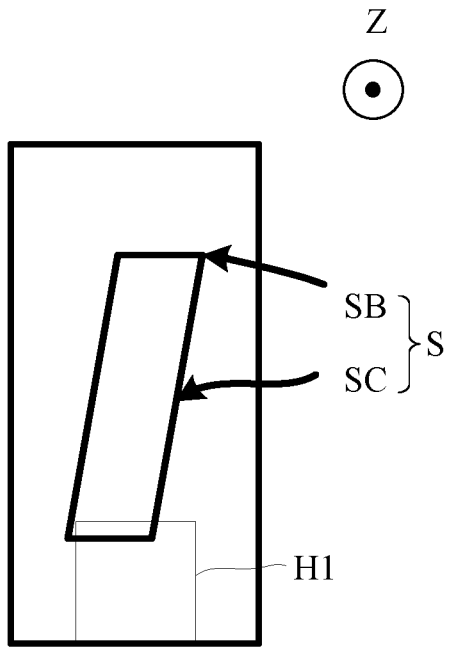
FIG. 2A to FIG. 2E are schematic top views of a portion of the electronic device according to different embodiments of the disclosure.
Figure 2B:
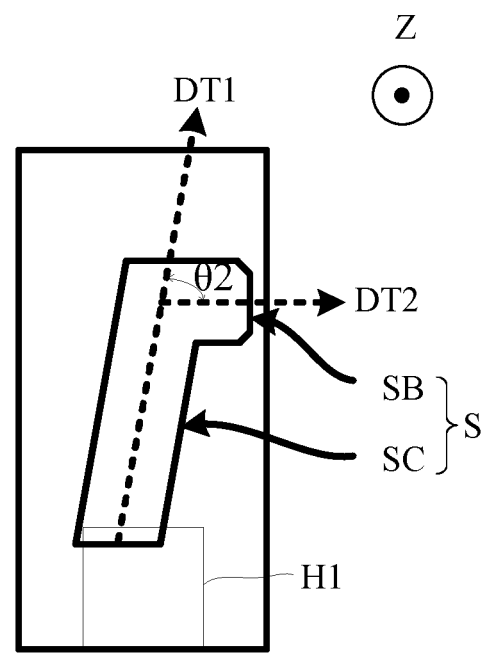
Figure 2C:
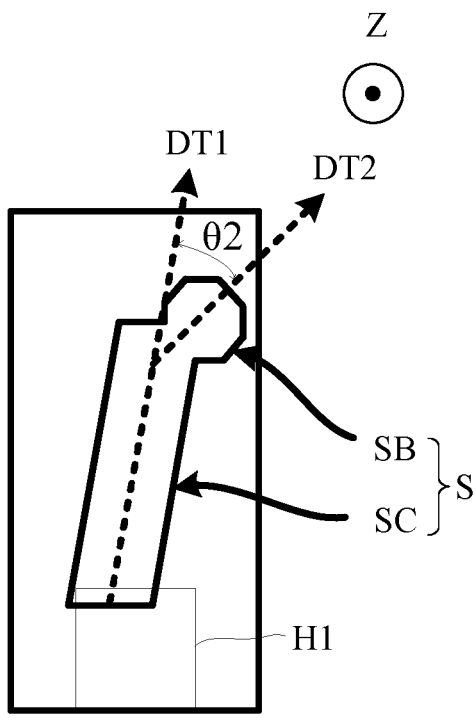
Figure 2D:
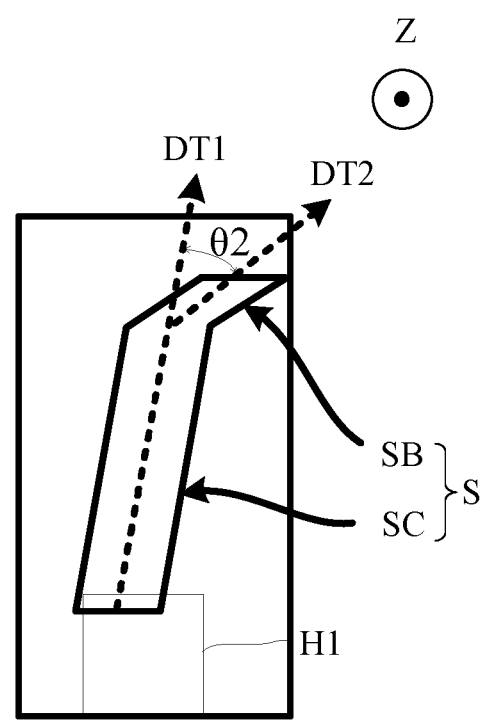
Figure 2E:
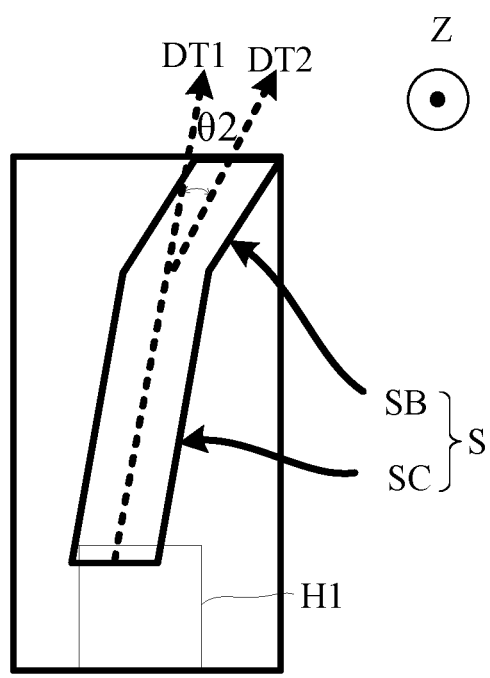

In some embodiments, as shown in FIG. 2A, the end portion SB of the slit S may not have the protrusion. In some embodiments, as shown in FIG. 2B to FIG. 2E, the shape of the protrusion of the end portion SB may be different from what is shown in FIG. 1B, and the included angle θ2 shown in FIG. 2B to FIG. 2E may be different from or the same as what is shown in FIG. 1B. In FIG. 2B to FIG. 2E, the included angle θ2 is, for instance, 80 degrees, 30 degrees, 50 degrees, and 20 degrees, respectively, but the included angle θ2 is not limited thereto.

Figure 3B:
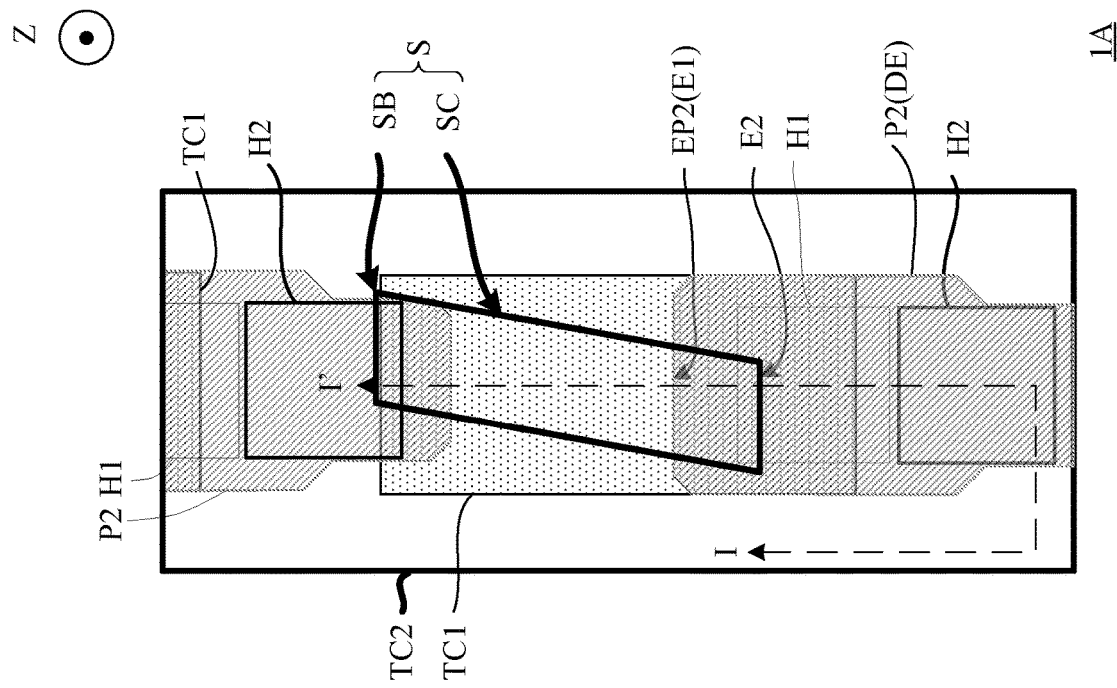
Figure 3A:
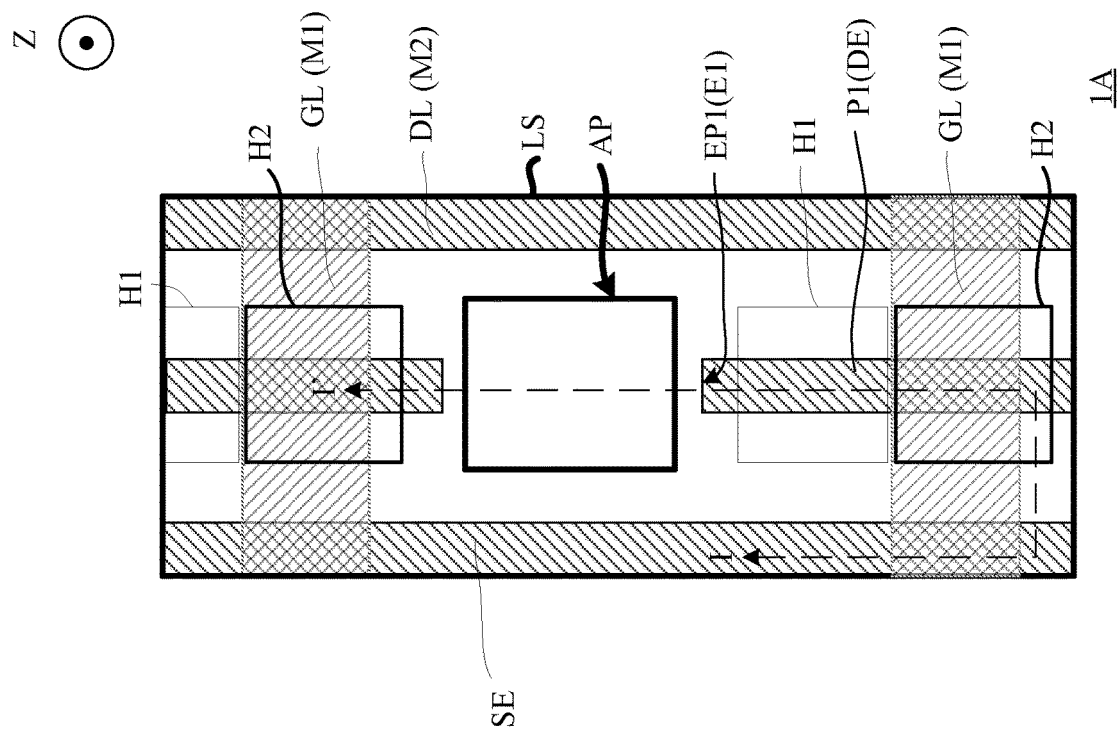
Figure 3C:
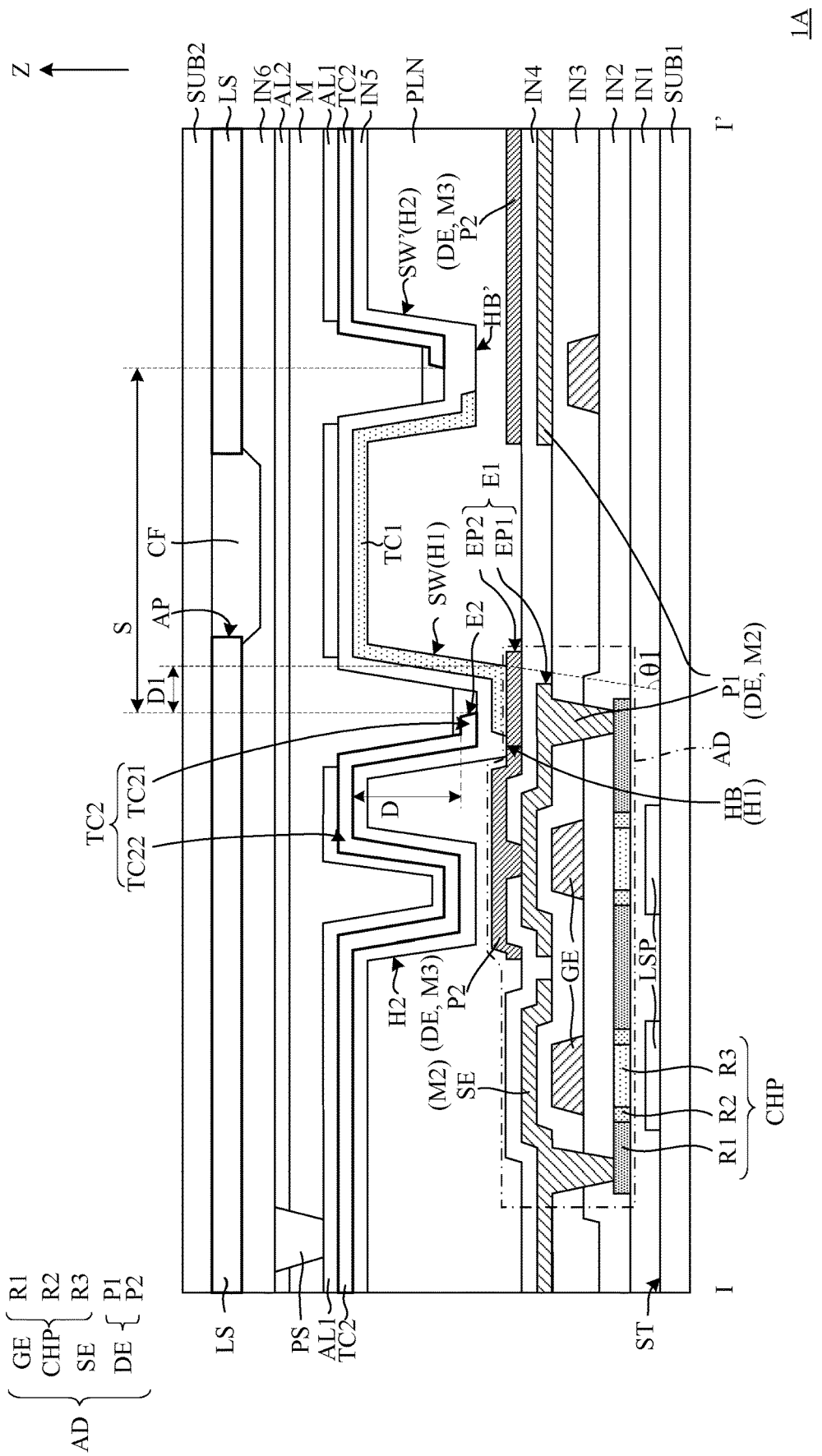

With reference to FIG. 3A to FIG. 3C, FIG. 3A and FIG. 3B respectively illustrate different film layers in the same region of the electronic device to clearly show the relative relationship of how the film layers are disposed. FIG. 3C is a schematic cross-sectional view corresponding to the sectional line I-I' in FIG. 3A and FIG. 3B. The main differences between an electronic device 1A and the electronic device 1 shown in FIG. 1A to FIG. 1C are described hereinafter. In the electronic device 1A, the insulating layer PLN includes a hole H2 in addition to the hole H1. As shown in FIG. 3C, the first transparent conductive layer TC1 is still disposed at a bottom HB' of the hole H2. The insulating layer IN5 is further disposed at the bottom HB' of the hole H2 and covers the first transparent conductive layer TC1 disposed at the bottom HB' of the hole H2. The second transparent conductive layer TC2 further extends into the hole H2. For instance, the second transparent conductive layer TC2 may extend a sidewall SW' or the bottom HB' of the hole H2. The gate electrode GE on the right side in FIG. 3C and a semiconductor pattern (not shown) may together constitute the driving element AD, so as to be electrically connected to another transparent conductive layer (such as a pixel electrode, not shown). For clear and simple illustration, other related elements are omitted and are not shown in FIG. 3C.

A depth of the hole H2 is, for instance, less than the depth of the hole H1, so as to reduce the possibility of short circuit of the first transparent conductive layer TC1 disposed at the bottom HB' of the hole H2 and the underlying electrode (such as the second portion P2 of the drain electrode DE). In some embodiments, a halftone mask (HTM) may be applied to form the hole H1 and the hole H2 with different depths, thereby reducing the number of times of mask exposures, which should however not be construed as a limitation in the disclosure.

The level difference of the transparent conductive layer (e.g., the level difference of the second transparent conductive layer TC2) is created by forming the hole H2 of the insulating layer PLN. Since the end portion SB of the slit S is designed to have no protrusion (with reference to FIG. 3B), the electric field distribution at the upper right corner of the slit S in FIG. 3B may also be improved, which is conducive to a further improvement of the liquid crystal efficiency while the impact of the graphic design of the slit S on the storage capacitor is reduced. Under the framework shown in FIG. 3C, the liquid crystal efficiency may be increased to 22% according to a calculation result of a simulation software.

Figure 4B:
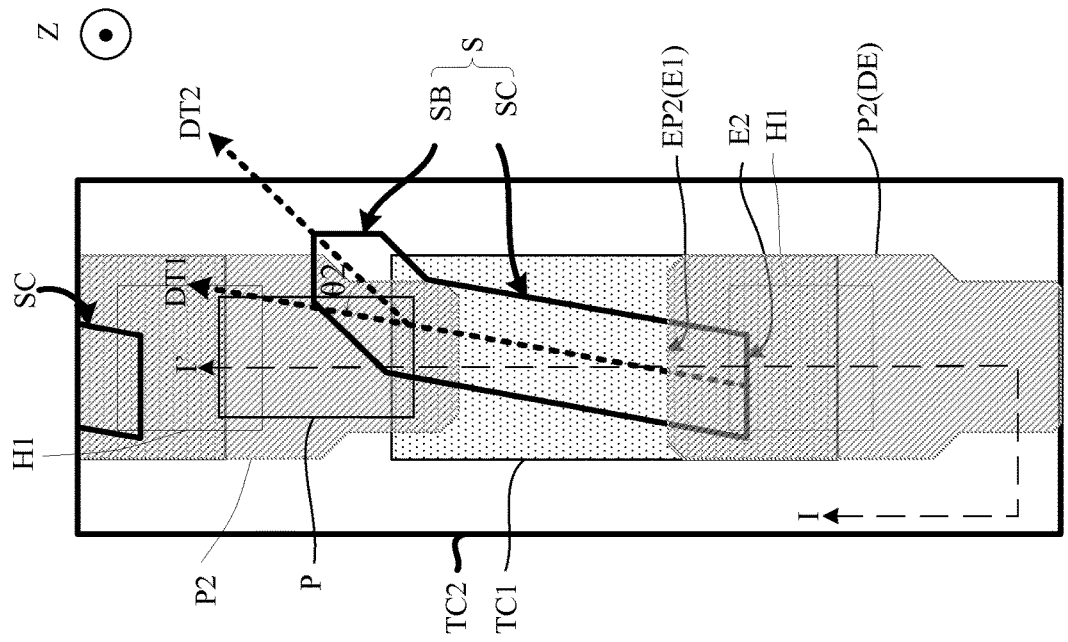
Figure 4A:
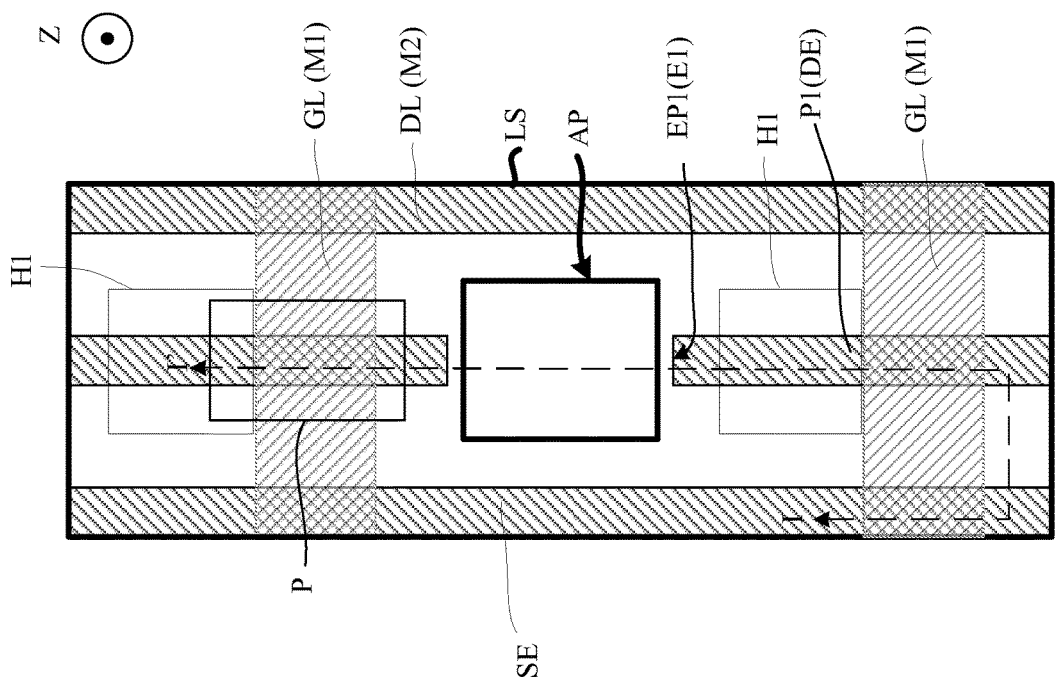
Figure 4C:
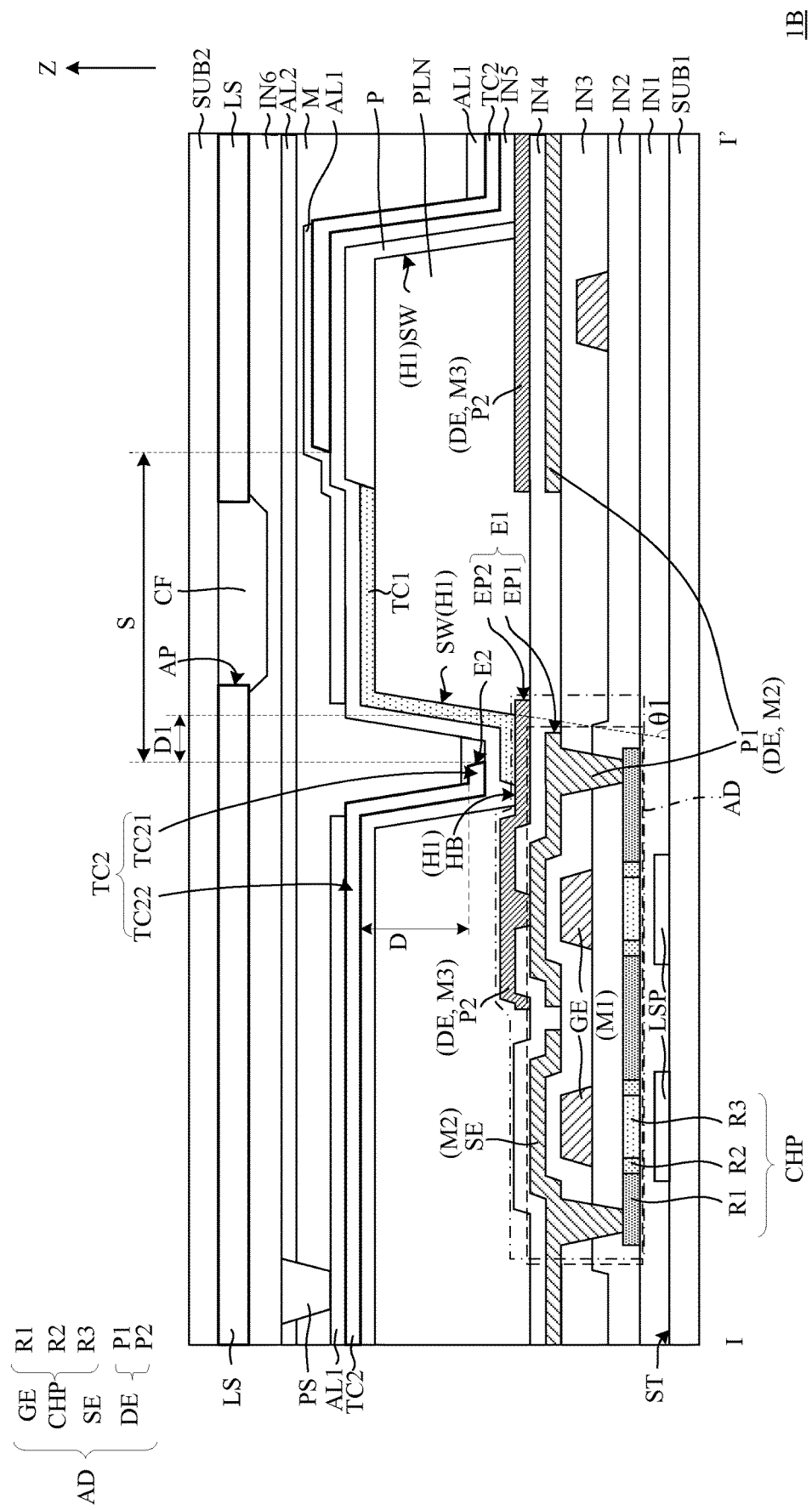

With reference to FIG. 4A to FIG. 4C, the main differences between an electronic device 1B and the electronic device 1 shown in FIG. 1A to FIG. 1C are described hereinafter. The electronic device 1B further includes a bump P. The bump P is, for instance, formed on the insulating layer PLN after the insulating layer PLN is formed, and the bump P covers the sidewall SW of the insulating layer PLN. In some embodiments, as shown in FIG. 4B, the bump P may be disposed corresponding to the upper right corner of the slit S, thereby creating a level difference of the transparent conductive layer (e.g., the level difference of the second transparent conductive layer TC2), so as to improve the electric field distribution at the upper right corner of the slit S in FIG. 4B and further enhance the liquid crystal efficiency. Under the framework shown in FIG. 4C, the liquid crystal efficiency may be increased to 21% according to a calculation result of a simulation software. In other embodiments, although not shown, the bump P may also be disposed corresponding to the lower left corner of the slit S in FIG. 4B, for instance, disposed on the left half of the hole H1 on the left side in FIG. 4C, thereby improving the level difference of the transparent conductive layer (e.g., the level difference between the portion TC21 and the portion TC22). Thereby, the electric field distribution at the lower left corner of the slit S in FIG. 4B may be improved, and the liquid crystal efficiency may be further enhanced. Alternately, under the framework shown in FIG. 4C, another bump may be further disposed on the left half of the hole H1 on the left side in FIG. 4C. The bump P may be an insulating layer and may be made of an organic material, an inorganic material, or a combination thereof, for instance. The material of the bump P may be the same as or different from that of the insulating layer PLN. The bump P may be made of silicon oxide, silicon nitride, silicon oxynitride, or a combination thereof. The gate electrode GE on the right side in FIG. 4C and a semiconductor pattern (not shown) may together constitute the driving element AD, so as to be electrically connected to another transparent conductive layer (such as a pixel electrode, not shown). For clear and simple illustration, other related elements are omitted and are not shown in FIG. 4C.

Figure 5B:
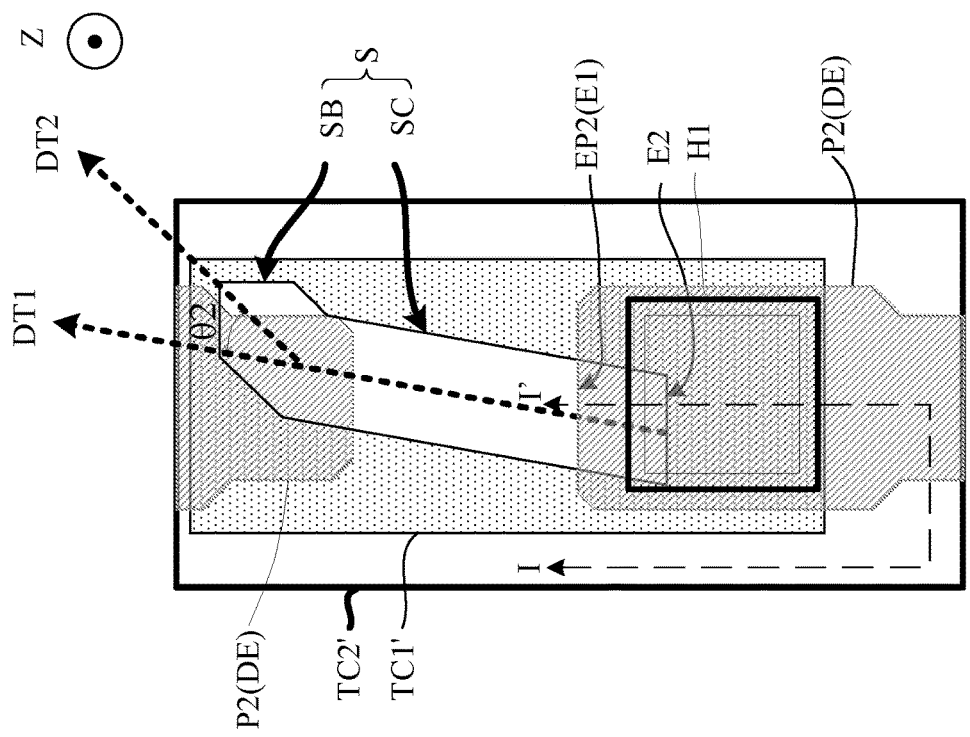
Figure 5A:
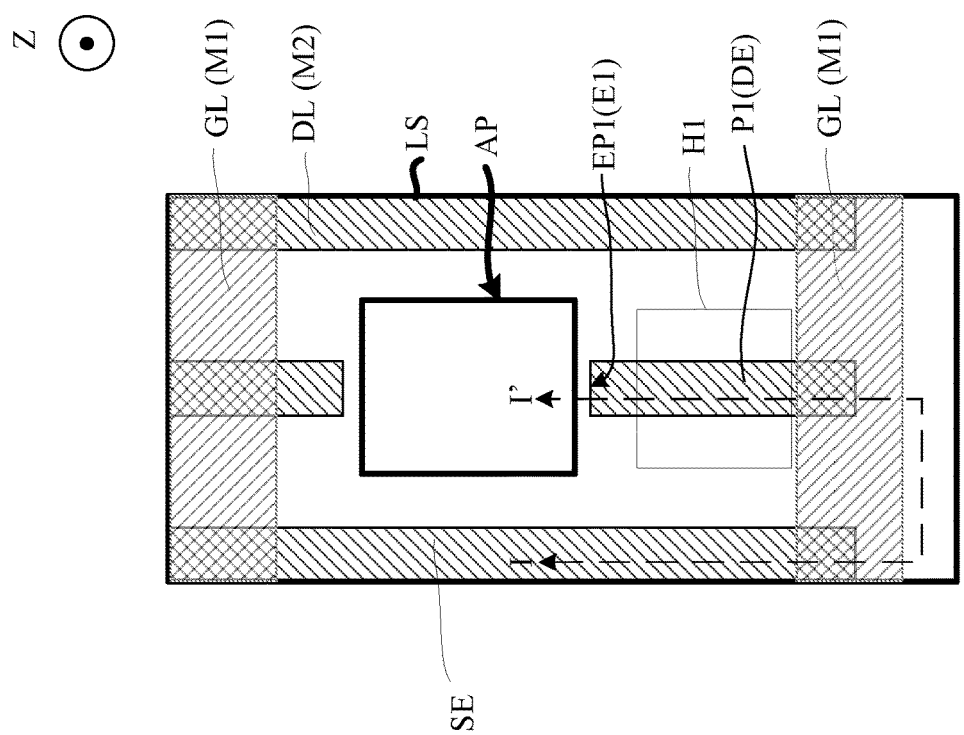
Figure 5C:
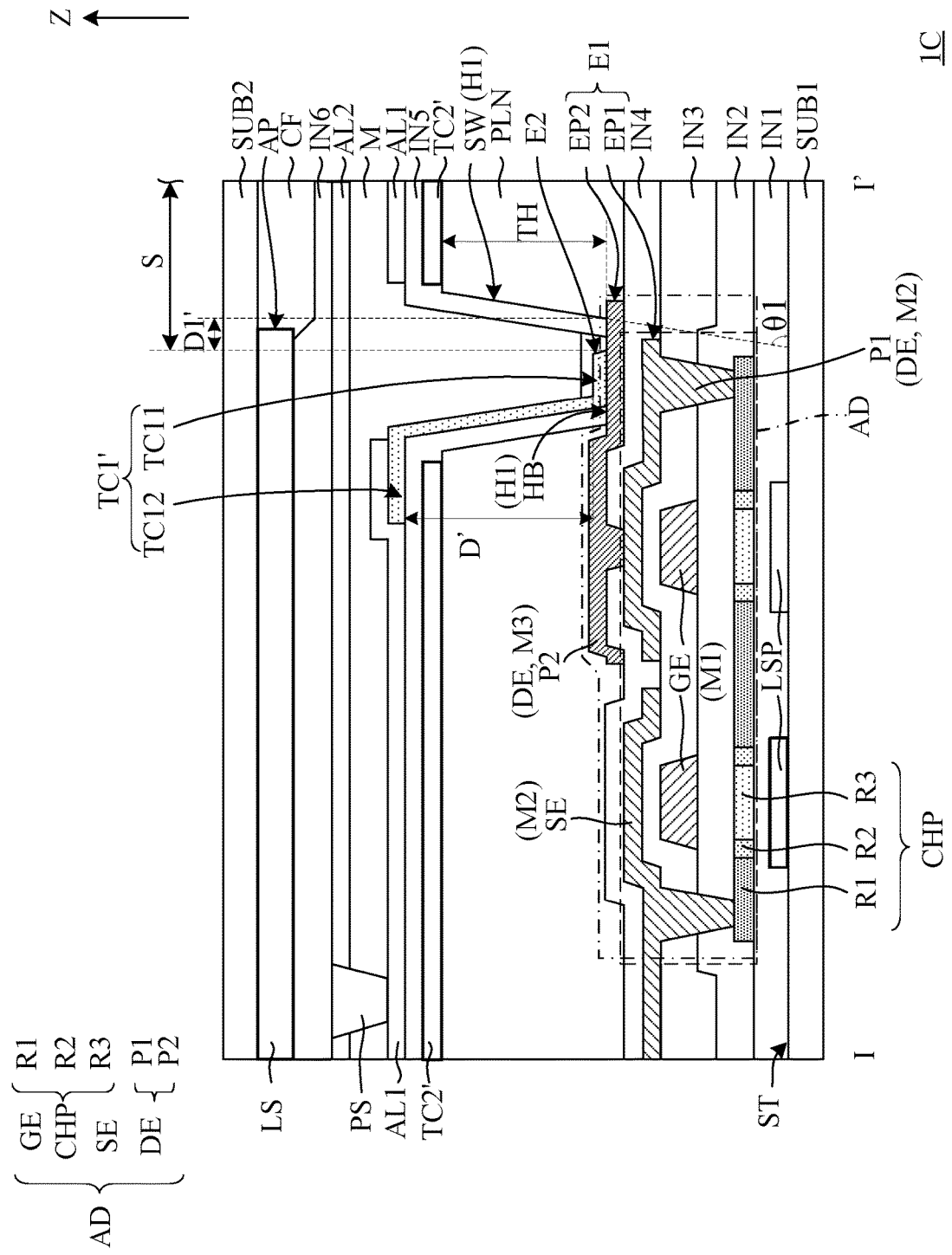

With reference to FIG. 5A to FIG. 5C, FIG. 5A and FIG. 5B respectively illustrate different film layers in the same region of the electronic device to clearly show the relative relationship of how the film layers are disposed. FIG. 5C is a schematic cross-sectional view corresponding to the sectional line I-I' in FIG. 5A and FIG. 5B. The main differences between the electronic device 1C and the electronic device 1 shown in FIG. 1A to FIG. 1C are described hereinafter. In the electronic device 1C, the second transparent conductive layer TC2' is located between the first transparent conductive layer TC1' and the insulating layer PLN, and the first transparent conductive layer TC1' includes the at least one slit S. The related descriptions of the at least one slit S may be referred to as those provided above and thus will not be repeated hereinafter. In this embodiment, a first transparent conductive layer TC1' may be a pixel electrode, and a second transparent conductive layer TC2' may be a common electrode. The first transparent conductive layer TC1' is disposed above the second transparent conductive layer TC2' to form an electronic device of a top-pixel type.

The first transparent conductive layer TC1' including the at least one slit S has a second edge E2, and the second edge E2 is located in the hole H1. That is, the second edge E2 overlaps the hole H1 in the normal direction Z, and in the cross-sectional view of the electronic device 1C, as shown in FIG. 5C, the second edge E2 is located between the bottom and the top of the hole H1. In the top view of the electronic device 1C, as shown in FIG. 5B, the hole H1 falls within the hole of the second transparent conductive layer TC2' (shown by a small frame illustrated by thick solid lines in FIG. 5B), for instance.

In some embodiments, as shown in FIG. 5C, one portion TC11 of the first transparent conductive layer TC1' is disposed on the bottom HB of the hole H1, and the other portion TC12 of the first transparent conductive layer TC1' is disposed on the insulating layer PLN, where the minimum distance D' between the portion TC11 of the first transparent conductive layer TC1' in the normal direction Z and the other portion TC12 of the first transparent conductive layer TC1' ranges from 0.5 μm to 2.5 μm, for instance. In addition, a distance D1' between the second edge E2 and the bottom edge of the hole H1 is, for instance, greater than 0 μm and less than 3 μm. In other embodiments, although not shown, the portion TC11 of the first transparent conductive layer TC1' may be disposed on the sidewall SW, which should however not be construed as a limitation in the disclosure.

In addition, the distance between the second edge E2 and the bottom HB of the hole H1 (not shown in FIG. 5C and may be referred to as the distance D2 shown in FIG. 1C') may range from 0% to 80% of the thickness TH of the insulating layer PLN (e.g., the distance from the bottom to the top of the hole H1 in the normal direction Z).

Through placing the second edge E2 of the transparent conductive layer with the at least one slit S (such as the first transparent conductive layer TC1') in the hole H1, the hole H1 of the insulating layer PLN may serve to create the level difference (such as the minimum distance D) of the transparent conductive layer (such as the first transparent conductive layer TC1'). By the graphic design of the level difference and the slit S, the electric field distribution may be changed, and the ratio of liquid crystal disclination lines entering the aperture region (the top view of the region occupied by the aperture AP) may be reduced, which is conducive to the improvement of the liquid crystal efficiency or the transmissivity. FIG. 5C is taken as an example. Through the above design of the included angle θ1 and the minimum distance D' (that is, the level difference of the first transparent conductive layer TC1'), the electric field distribution at the lower left corner of the slit S in the top view of the electronic device 1C (as shown in FIG. 5B) may be improved, and the liquid crystal efficiency may be further enhanced. In addition, according to the design of the included angle θ2, the shape of the end portion SB of the slit S is adjusted, so that the electric field distribution at the upper right corner of the slit S may be improved, and the liquid crystal efficiency may be further enhanced.

To sum up, in one or more embodiments of the disclosure, through placing the second edge of the transparent conductive layer with the at least one slit S (such as the first transparent conductive layer or the second transparent conductive layer) in the hole, the hole of the insulating layer may serve to create the level difference of the transparent conductive layer. By the graphic design of the level difference and the slit, the electric field distribution may be changed, and the ratio of liquid crystal disclination lines entering the aperture region may be reduced, which is conducive to the improvement of the liquid crystal efficiency or the transmissivity.

The above embodiments merely serve to illustrate, but not to limit, the technical solutions of the disclosure. Although the disclosure has been described in detail with reference to the above embodiments, persons skilled in the art should understand that the technical solutions described in the above embodiments can still be modified or some or all of the technical features thereof can be equivalently replaced. However, the modifications or replacements do not cause the essence of the corresponding technical solutions to deviate from the scope of the technical solutions of the embodiments of the disclosure.

Although the embodiments of the disclosure and the advantages thereof have been disclosed above, it should be understood that any person skilled in the art can make changes, substitutions, and modifications without departing from the spirit and scope of the disclosure, and the features of the embodiments can be arbitrarily mixed and replaced to form other new embodiments. In addition, the protection scope of the disclosure is not limited to the process, machine, manufacture, material composition, device, method, and steps in the specific embodiments described in the specification. Any person skilled in the art can understand conventional or future-developed processes, machines, manufactures, material compositions, devices, methods, and steps from the content of the disclosure as long as the same can implement substantially the same functions or achieve substantially the same results in the embodiments described herein. Therefore, the protection scope of the disclosure includes the above processes, machines, manufactures, material compositions, devices, methods, and steps. In addition, each claim constitutes a separate embodiment, and the protection scope of the disclosure further includes combinations of the claims and the embodiments. The protection scope of the disclosure should be defined by the appended claims.

What is claimed is:

1. An electronic device, comprising:
   a substrate;
   a driving element, disposed on the substrate and comprising a drain electrode, the drain electrode having a first edge;
   a first transparent conductive layer, disposed on the driving element;
   an insulating layer, disposed between the driving element and the first transparent conductive layer and comprising a hole, wherein the first transparent conductive layer is electrically connected to the driving element through the hole; and
   a second transparent conductive layer, disposed on the insulating layer,
   wherein one of the first transparent conductive layer and the second transparent conductive layer comprises at least one slit, the first transparent conductive layer or the second transparent conductive layer comprising the at least one slit has a second edge, the second edge is located in the hole, and the at least one slit exposes the first edge of the drain electrode,
   wherein the first transparent conductive layer is located between the second transparent conductive layer and the insulating layer, and the second transparent conductive layer comprises the at least one slit.

2. The electronic device according to claim 1, wherein the substrate has a normal direction, and the second edge overlaps the hole in the normal direction.

3. The electronic device according to claim 1, wherein the substrate has a normal direction, one portion of the second transparent conductive layer is disposed at a bottom of the hole, and the other portion of the second transparent conductive layer is disposed on the insulating layer, wherein a minimum distance from the one portion of the second transparent conductive layer to the other portion of the second transparent conductive layer in the normal direction ranges from 0.5 μm to 2.5 μm.

4. The electronic device according to claim 1, wherein the hole has a sidewall, and an included angle between the sidewall and an upper surface of the substrate ranges from 40 degrees to 85 degrees.

5. The electronic device according to claim 4, wherein the included angle ranges from 50 degrees to 85 degrees.

6. The electronic device according to claim 1, wherein the at least one slit comprises an end portion far from the drain electrode, and the end portion comprises a protrusion.

7. The electronic device according to claim 6, wherein the at least one slit further comprises a trunk portion connected to the end portion, and an included angle between an extension direction of the trunk portion and a direction in which the protrusion faces away from the trunk portion ranges from 10 degrees to 80 degrees.

8. The electronic device according to claim 7, further comprising:
   a data line, disposed on the substrate and electrically connected to the driving element, wherein the included angle between the extension direction of the trunk portion and an extension direction of the data line is greater than 0 degrees and less than 90 degrees.

9. The electronic device according to claim 1, wherein a distance from the second edge to an edge of the bottom of the hole is greater than 0 μm and less than 3 μm.

10. The electronic device according to claim 1, wherein the substrate has a normal direction in which a distance from the second edge and a bottom of the hole ranges from 0% to 80% of the thickness of the insulating layer.

11. The electronic device according to claim 1, further comprising:
    a light shielding pattern, disposed on the substrate and overlapping a channel region of the driving element.

12. The electronic device according to claim 1, further comprising:
    another substrate, disposed opposite to the substrate; and
    a light shielding layer, disposed on a surface of the another substrate facing the substrate, the light shielding layer having an aperture, the at least one slit at least partially overlapping the aperture.

13. The electronic device according to claim 1, wherein the insulating layer further comprises another hole, a depth of the another hole is less than a depth of the hole, the first transparent conductive layer and the second transparent conductive layer are stacked on the insulating layer and electrically insulated from each other, and each of the first transparent conductive layer and the second transparent conductive layer extends into the hole and the another hole.

14. The electronic device according to claim 1, further comprising:
    a bump, disposed on the insulating layer and covering a sidewall of the insulating layer, wherein in a top view of the electronic device the bump is disposed corresponding to an upper right corner or a lower left corner of the at least one slit.

15. The electronic device according to claim 14, wherein a material of the bump comprises an organic material, an inorganic material, or a combination thereof.

16. An electronic device, comprising:
    a substrate;
    a driving element, disposed on the substrate and comprising a drain electrode, the drain electrode having a first edge;
    a first transparent conductive layer, disposed on the driving element;
    an insulating layer, disposed between the driving element and the first transparent conductive layer and comprising a hole, wherein the first transparent conductive layer is electrically connected to the driving element through the hole; and
    a second transparent conductive layer, disposed on the insulating layer,
    wherein one of the first transparent conductive layer and the second transparent conductive layer comprises at least one slit, the first transparent conductive layer or the second transparent conductive layer comprising the at least one slit has a second edge, the second edge is located in the hole, and the at least one slit exposes the first edge of the drain electrode, wherein the drain electrode comprises a first portion and a second portion, the first portion is located between the second portion and the substrate, the second portion is electrically connected to the first portion, the hole partially exposes the second portion, and the first transparent conductive layer is electrically connected to the second portion of the drain electrode through the hole.

17. The electronic device according to claim 16, wherein the first edge of the drain electrode comprises an edge of the first portion and an edge of the second portion, and the at least one slit exposes the edge of the first portion and the edge of the second portion.

18. The electronic device according to claim 16, wherein the first transparent conductive layer is located between the second transparent conductive layer and the insulating layer, and the second transparent conductive layer comprises the at least one slit.

19. The electronic device according to claim 16, wherein the second transparent conductive layer is located between the first transparent conductive layer and the insulating layer, and the first transparent conductive layer comprises the at least one slit.

20. The electronic device according to claim 16, wherein the hole has a sidewall, and an included angle between the sidewall and an upper surface of the substrate ranges from 40 degrees to 85 degrees.

* * * * *